(12) United States Patent
Wold (10) Patent No.: US 8,337,707 B2
(45) Date of Patent: Dec. 25, 2012

(54) DEWATERING FACILITY (75) Inventor: Torbjörn Wold, Lidköping (SE)

(73) Assignee: Leif Ahl Verkstad Aktiebolag, Lidkoping (SE)

( * ) Notice: Subject to any disclaimer, the term of this patent is extended or adjusted under 35 U.S.C. 154(b) by 483 days.

(21) Appl. No.: 12/593,624

(22) PCT Filed: Mar. 26, 2008

(86) PCT No.: PCT/SE2008/050337
§ 371 (c)(1),
(2), (4) Date: Sep. 29, 2009

(87) PCT Pub. No.: WO2008/121058
PCT Pub. Date: Oct. 9, 2008

(65) Prior Publication Data
US 2010/0102005 A1 Apr. 29, 2010

(30) Foreign Application Priority Data

Mar. 29, 2007 (SE) ...................... 0700810

(51) Int. Cl.
*C02F 1/52* (2006.01)
*B01D 12/00* (2006.01)
*B01D 24/00* (2006.01)
*B01D 33/00* (2006.01)

(52) U.S. Cl. ........ 210/709; 210/208; 210/519; 210/523; 210/803

(58) Field of Classification Search .................. 210/709, 210/208, 86–89, 519, 523, 521, 803
See application file for complete search history.

(56) References Cited

U.S. PATENT DOCUMENTS

| 1,433,865 | A | * | 10/1922 | Wolf ................................ 162/59 |
| 1,452,151 | A | * | 4/1923 | Genter et al. ............. 210/748.01 |
| 1,716,228 | A | * | 6/1929 | Horne ........................... 210/524 |
| 2,716,489 | A | * | 8/1955 | Way ............................... 210/140 |
| 4,142,970 | A | | 3/1979 | Von Hagel |
| 4,526,687 | A | | 7/1985 | Nugent |
| 4,536,286 | A | | 8/1985 | Nugent |

(Continued)

FOREIGN PATENT DOCUMENTS

DE  9409932 U1  10/1994

(Continued)

OTHER PUBLICATIONS

Shim et al., KR2002052676A, Derwent acc No. 2003-026667—abstract and figure.*

(Continued)

*Primary Examiner* — Christopher Upton
*Assistant Examiner* — Nader Hossaini
(74) *Attorney, Agent, or Firm* — Jeffrey S. Melcher; Manelli Selter PLLC (57) ABSTRACT

The present invention relates to a device, for dewatering dredged material with a dry substance rate below 15%, comprising a tank (2) which is arranged with at least one inlet (5) for dredged material, a first outlet (8) for cleaned water and a second outlet (9) for sludge; the tank further comprises a mixing chamber (3), to which the inlet (5) for dredged masses leads, and a sedimentation chamber (4) in which the first (8) and the second outlet (9) are arranged. The mixing chamber (3) and the sedimentation chamber (4) are in fluid communication.

25 Claims, 6 Drawing Sheets

U.S. PATENT DOCUMENTS

| | | | |
|---|---|---|---|
| 4,592,845 A | | 6/1986 | Lejeune |
| 5,006,231 A | | 4/1991 | Oblad |
| 5,643,443 A | * | 7/1997 | Ishikura ........................ 210/113 |
| 5,931,657 A | * | 8/1999 | Klouda et al. ................ 431/181 |
| 6,110,382 A | * | 8/2000 | Wiemers et al. ............. 210/709 |

FOREIGN PATENT DOCUMENTS

| | | | |
|---|---|---|---|
| DE | 102004012024 A1 | | 9/2005 |
| EP | 0148738 A1 | | 7/1985 |
| EP | 0524039 A1 | | 1/1993 |
| GB | 365513 A | | 1/1932 |
| JP | 02052098 A | | 2/1990 |
| NL | 9401043 A | * | 2/1996 |

OTHER PUBLICATIONS

Kim, KR2004084458 A, Derwent acc No. 2005-138479—abstract and figure.*

International Search Report and Written Opinion issued in parent PCT application.

European Search Report issued in parent PCT application, Jul. 6, 2012.

* cited by examiner

DEWATERING FACILITY

CROSS-REFERENCE TO RELATED APPLICATIONS

This application is a national stage entry under 35 U.S.C. 371 of International Application No. PCT/SE2008/050337, filed 26 Mar. 2008, designating the United States. This application claims foreign priority under 35 U.S.C. 119 and 365 to Swedish Patent Application No. 0700810-5, filed 29 Mar. 2007.

TECHNICAL FIELD

The present invention refers to a device for dewatering dredged material with a dry substance rate of less than 15%, comprising a tank which is provided with at least one inlet conduit for contaminated dredged material, a first outlet for cleaned water and a second outlet for sludge; the tank further comprises a mixing chamber into which the entrance port for dredged material leads and a sedimentation chamber in which the first and the second outlet are arranged, and where the mixing chamber and the settling chamber are in fluid communication with each other.

BACKGROUND

The environmental regulations are getting harder and harder with regards to deposition and destruction of dredged material and there is therefore an increased demand for fast and effective dewatering of dredged materials from harbours, channels, cool ponds, settling basins etc. The flow from dredged contents generally contains 1-10% dry substance rate and the present invention relates to facilities which can remove clean water and increase the dry substance rate to 10-30%. The dewatered dredged material can afterwards either be deposited or proceed to further processing.

It is of course advantageous the more cubic meters per hour that can be dewatered and the lower the costs for performing the dewatering can be kept. In order to make it possible to process a large flow, it is important to get a quick flocculation of the impurities and a quick sedimentation of the flocculated impurities. It is therefore advantageous if the flocculate chemicals can be mixed with the contaminated water quickly and effectively. This can be achieved by mixing the contaminated water and the flocculation chemicals under high turbulence. It is, however, also advantageous if the water subjected to turbulence can be stilled quickly in a sedimentation zone to make the flocculated contamination sink to the bottom of the sedimentation zone.

It would also be advantageous to avoid to the greatest extent possible the use of expensive and perhaps even environmentally hazardous chemicals and to keep the amount of additives as low as possible. Further, it is also an advantage if the manufacturing costs for dewatering arrangements can be kept low, that they are robust and that they can be run with as few interruptions as possible.

A further advantage would be to have the dewatering facility easily movable. For example, when the dredged materials from a contaminated harbour are dewatered it could be moved to the next contaminated harbour. This reduces the risk for the dewatering facility to be idle and at the same time makes it possible to dewater in places where it would not otherwise be an economical possibility.

It is also an advantage the lower the manufacturing costs are and that the costs of running can be kept as low as possible.

U.S. Pat. No. 7,001,525, U.S. Pat. No. 5,730,864, U.S. Pat. No. 7,014,776 are examples of constructions for purifying water, where a sedimentation zone is being used.

SHORT DESCRIPTION OF THE INVENTION

At least one of the advantages above is obtained by an arrangement for dewatering and purification of contaminated dredged materials with a dryness of less than 15% according to the present invention. The device comprises a tank that has at least one inlet conduit for contaminated dredged materials, a first outlet for purified water and a second outlet for sludge for deposit or further shaping. The tank further comprises a mixing chamber to which the inlet for dredged materials lead and a sedimentation chamber in which the first and the second outlets are arranged. The mixing chamber and the sedimentation chamber are in fluid communication. The inlet conduit is preferably a tubular conduit with a connection opening on the outside of the tank for connection to an exterior hose or the like and an outlet leading to the mixing chamber. The inlet conduit comprises a connection for supply of at least one flocculation chemicals. The mixing chamber includes a turbulence means for creating a turbulent flow in the mixing chamber for mixing incoming dredged material with the at least one flocculation chemical.

The turbulence means is preferably in the form of a disk with protrusions/profiles centrally arranged in the mixing chamber at a predetermined distance from the outlet opening, achieves a turbulent flow in the mixing chamber when the incoming ray of dredged material meets the turbulence means, so that the contaminated dredged materials and the added at least one flocculation chemicals are properly mixed.

According to further aspects of the present invention it is advantageous that the turbulence means is surrounded by a cylinder which is open-ended and where the turbulence means is disc shaped and arranged mainly parallel to the radial extension of the cylinder. Preferably, the cylinder also surrounds the inlet opening.

the tubular conduit is tapered at its end.

the mixing chamber is considerably smaller than the sedimentation chamber, preferably less than ¹⁄₁₀ of its size but more preferred less than ¹⁄₂₀ of its size.

the second outlet for sludge is arranged at the bottom of the sedimentation chamber, and that the sedimentation chamber comprises means for moving sediment to the second outlet. Preferably, said means for moving sediment comprises at least one longitudinal feeding screw, arranged longitudinally on the bottom of the sedimentation chamber, more preferred at least three longitudinal feeding screws, even more preferred at least five longitudinal feeding screws.

the sedimentation chamber has an oblong shape, where its length is adapted to be at least four times longer than the normal water level in the sedimentation chamber, and that the mixing chamber is arranged at one of the longitudinal ends of the sedimentation chamber and the first outlet is arranged at an upper part of the opposite end.

the second outlet of the sedimental chamber comprises conically tapering indention in the bottom of the sedimentation chamber, where a first transversally arranged feeding screw is arranged at the bottom of the indention, which is arranged to feed sludge out via a sludge valve.

a level indicator is arranged above the second outlet to measure the sludge accumulation there.

a dry substance rate indicator is arranged in the tubular conduit upstream of the connection for flocculation chemicals, to measure the dry substance rate of the incoming contaminated dredged materials in the tubular conduit.

the arrangement further comprising a control unit, which determines, based upon information from the dry substance rate indicator, the quantity of at least one flocculation chemical, which is to be added to the incoming contaminated dredged material at the connection for flocculation chemicals and which control unit based on the information from the level indicator, also regulates the speed of the first transversally arranged outlet feeding screw and the opening and closure of the sludge valve.

the at least one flocculation chemical added is a liquid polymer.

a second transversally arranged outlet screw on the bottom of the mixing chamber for removing larger objects such as stones and gravel from the bottom of the mixing chamber via a third outlet.

the device is mobile the device includes evacuation means for removing larger objects like stones and gravel from the bottom of the mixing chamber.

the evacuation means being a second outlet screw at the bottom of the mixing chamber arranged to remove larger objects like stones and gravel from the bottom of the mixing chamber via a third outlet of the tank.

the second outlet screw is upwardly tilted towards the third outlet.

Further, a method for dewatering of dredged material is suggested, where the contaminated dredged materials are pumped into a tank via a conduit, the method comprising the following steps:

a) the measuring of the dry substance rate of the incoming contaminated dredged materials in the tubular conduit;

b) introduction of at least one flocculation chemical in the conduit of the incoming contaminated dredged materials where the amount of added at least one flocculation chemical is determined by the measurement in step a);

c) mixing in mixing chamber of the contaminated dredged materials and the added at least one flocculation chemical which mixture is achieved by the contaminated dredged materials injected to a turbulence means with the added at least one flocculation chemical being in the mixing chamber, whereupon a turbulent flow is created in the mixing chamber;

d) sedimentation of the mixture of step c) in a sedimentation chamber in fluid connection with the mixing chamber;

e) outlet of sediment via a second outlet on the bottom of the sedimentation chamber;

f) outlet of clear surface water at the top of the sedimentation chamber via a first outlet.

DETAILED DESCRIPTION OF THE INVENTION

FIG. 1-5 shows a facility 1 for dewatering and purification of contaminated dredged material comprising a tank 2 which is in the form of an oblong horizontal tube with a circular cross section. The tank is arranged on a trailer with wheels 26 and can be connected to a truck for relocation, i.e. like a tank truck.

A vertical wall 31 divides the tank 2 into two sections 3, 29; 4, 22, where the first section 3, 29 between a first end 36 of the tank 2 and the wall 31 comprises a mixing chamber 3 located above a control and regulation compartment 29 so that the bottom of the mixing chamber 37 is the top of the control and regulation compartment 29 and where the second section 4, 22 between the wall 31 and a second end 35 of the tank 2 comprises a sedimentation chamber 4 and a turbulence reducing passage 22, which turbulence reducing passage 22 connects the mixing chamber 3 to the sedimentation chamber 4. As is seen in the drawings the second section 4, 22 of the tank 2 is approximately 5-10 times longer than the first section 3, 29.

The wall 31 has a first upper opening 22a between the mixing chamber 3 and the turbulence reducing passage 22. The turbulence reducing passage 22 is formed by the space which is limited by the wall 31 and a distribution sheet 32 which reduces the turbulence by distributing the fluid flow.

Figure 1:
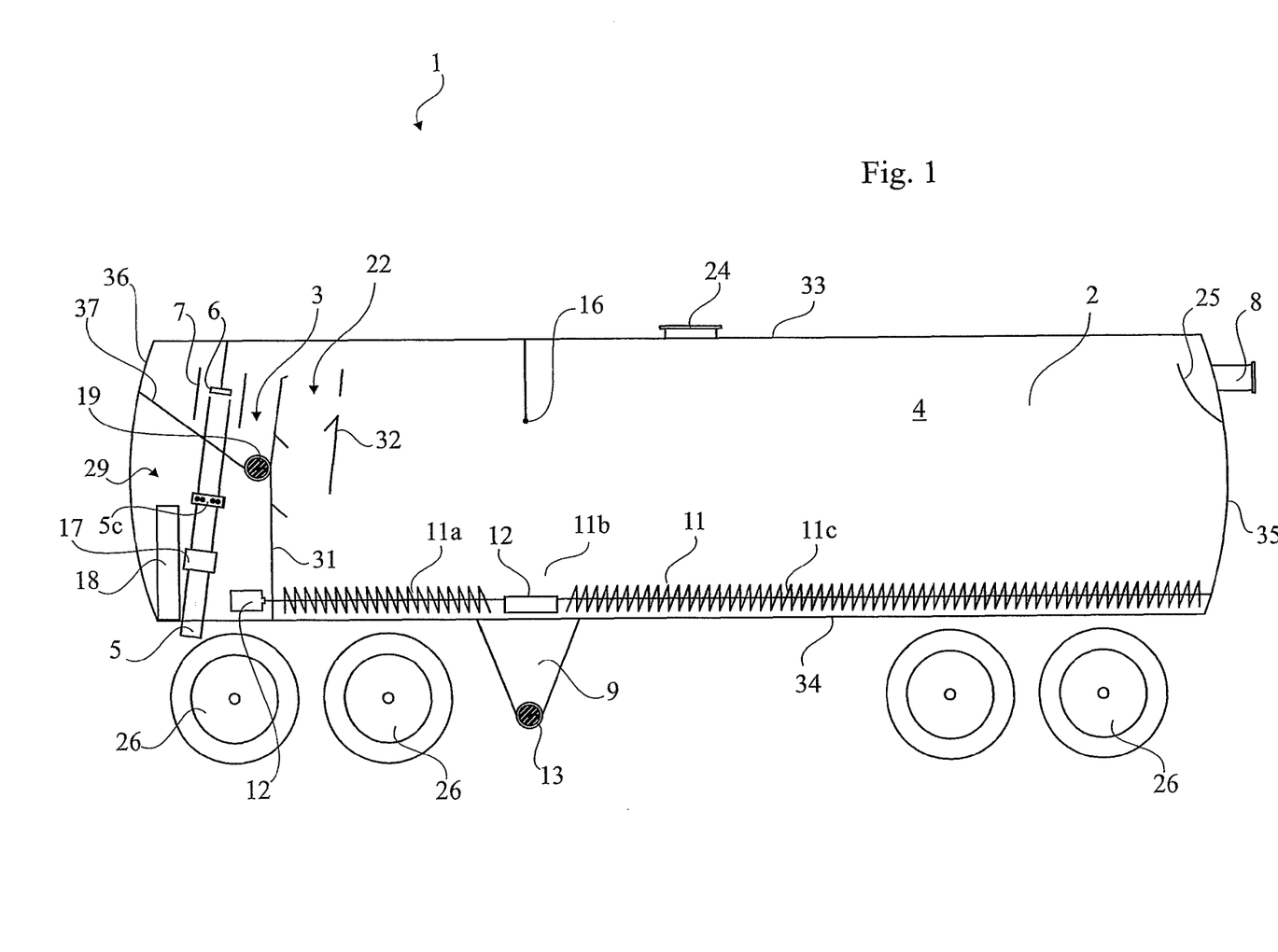
FIG. 1 shows schematically a side view of the dewatering device and the parts thereof according to a preferred embodiment of the present invention.
Figure 2:
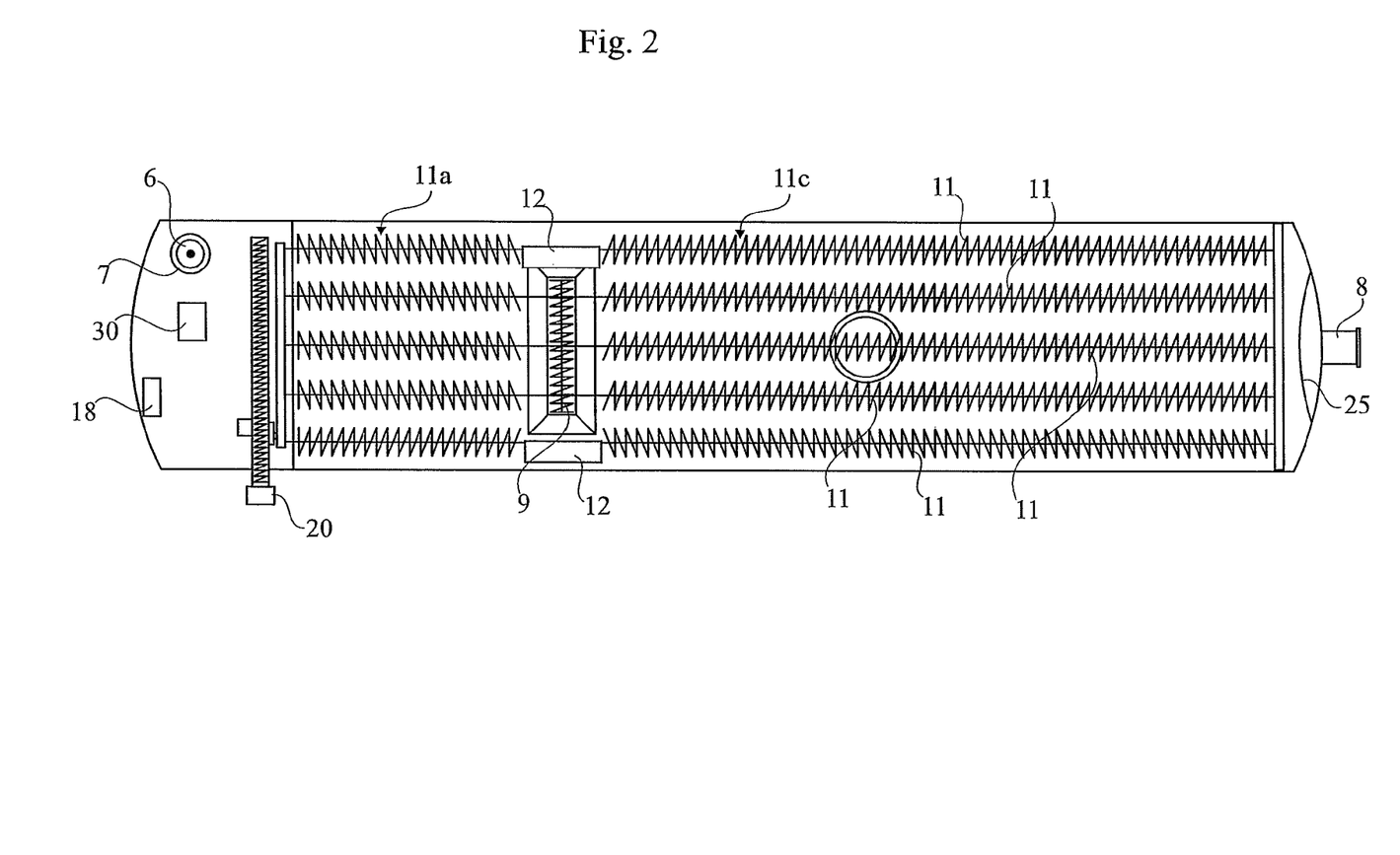
FIG. 2 shows schematically a view of the dewatering device according to a preferred embodiment of the invention seen from above.
Figure 3:
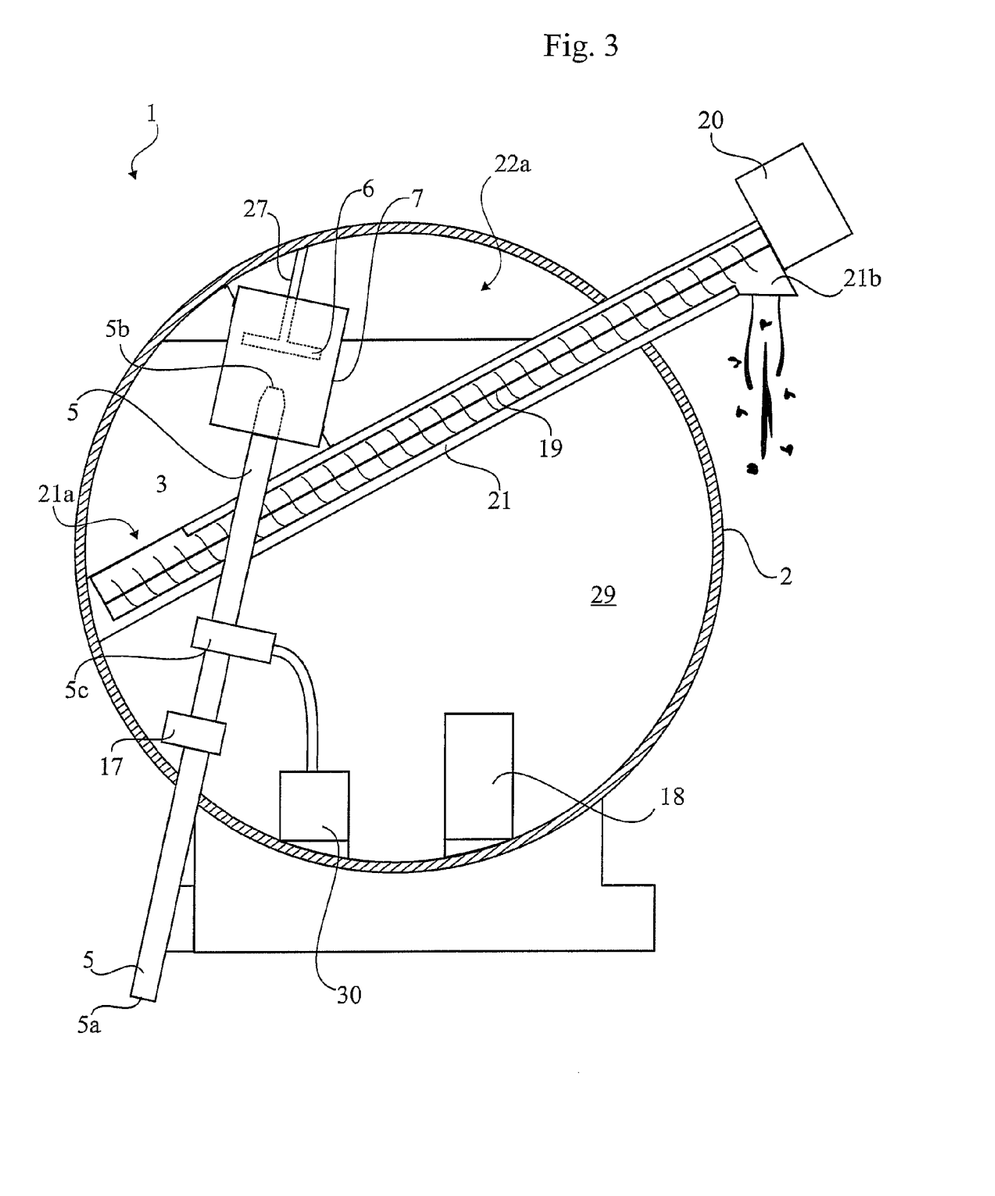
FIG. 3 shows schematically a cross-sectional view of the mixing chamber and the control and regulation compartment of the dewatering device.
Figure 4:
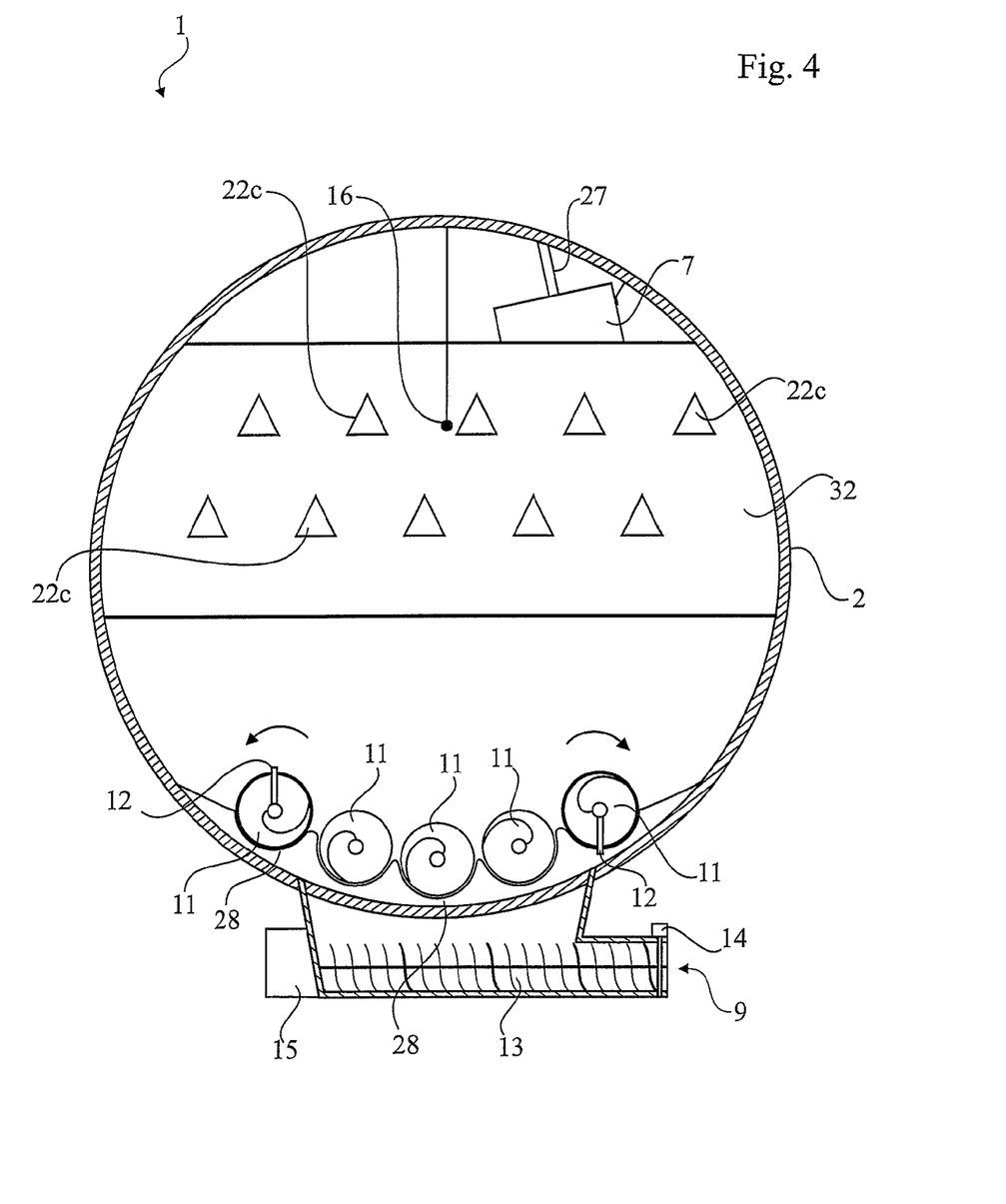
FIG. 4 shows a schematically cross-sectional view of the sludge outlet towards the front end of the dewatering device.

The distribution sheet extends (towards the bottom of the tank 34), and ends about midway between the top of the tank 33 and its bottom 34, where there is a lower opening 22b to the sedimentation chamber 4. A second upper opening 22d, between the upper side 33 of the tank 2 and the distribution sheet 32, also connects the turbulence reducing passage 22 to the sedimentation chamber. The distribution sheet 32 further has a number of triangular openings 22c which contribute in dividing the flow of water and lessens the turbulence. FIG. 4 shows two parallel rows of five triangular openings 22c each which are somewhat displayed to each other horizontally. A number of angled sheets 23 are also present in the turbulence reducing passage 22 and downwards in order to direct the flow in the turbulence reducing passage 22.

The sedimentation chamber 4 has got a first outlet 8 for clean water at the other end 35 of the tank. This first outlet 8 is situated high up on the other side 35 in the level at a height where it is desired to have the water level in the tank. Means for preventing underflow, for instance a screening sheet 25, screens off the first outlet 8 from absorbing the water from below, which means that only clean surface water leaves the tank 2. The sedimentation chamber 4 is oblong in shape and its length is preferably at least 3 times its diameter, more preferred at least 4 times.

An inspection gate to the sedimentation chamber 4 is labelled by 24.

At the bottom of the sedimentation chamber 4 is a second outlet 9 arranged, which comprises a conically tapering indention with a first transversally arranged outlet screw 13 situated in the bottom of the indention for feeding sludge via a sludge valve 14. The first transversally arranged outlet screw 13 is operated by a first outlet screw engine 15 A level indicator 16 extends downwards from the top side of the tank 2 above the conically tapering indention and determining the distance to the sedimentation, i.e. the height of the sludge amassed at the conically tapering indention. The level indicator 16 sends information of the sludge concentration to the control unit 18 which from this data sends control signals to the sludge valve 14 and the first screw motor 15 to regulate the out speed of the sediment sludge.

Along the bottom of the sedimentation chamber 4 are five parallel longitudinal screws 11 in five corresponding longitudinal profiles 28, which are found on each side of the outlet 9. The longitudinal screws 11 are motor driven and rotate with a constant speed when the device 1 is in operation. However the speed could of course be made variable.

To clarify the function of the feeding screws 11 we have divided them into three segments 11a, 11b and 11c. The first segment 11a is mounted and tightened in the vertical wall 31 and leads into the control and regulating chamber 29, where it is connected to its driving. This segment 11a is equipped with large threads which feed the sediment towards the second outlet 9 as the feeding screws 11 rotate. The second segment of the feeding screws 11 is above the second outlet 9. This segment 11b has no threads, but the two outermost feeding screws 11 here have an axially extending rectangular part 12 in order to push the sludge towards the indention at the second outlet 9. The third segment 11c continues after the outlet 9 to the other end 35 where it is mounted. This segment 11c is also provided with large threads which push the sediment towards the second outlet 9 as the feeding screws 11 rotate. It is to be noted that the threads of the first segment 11a and the second segment 11b have opposite threading direction since they are to push the sediment in two opposite directions. Further it is suitable that the two outermost situated feeding screws 11 rotate in different directions which are chosen, so that they push the sludge towards the middle. Consequently they will have opposite threading directions for the segments 11a and 11c, respectively.

Figure 5:
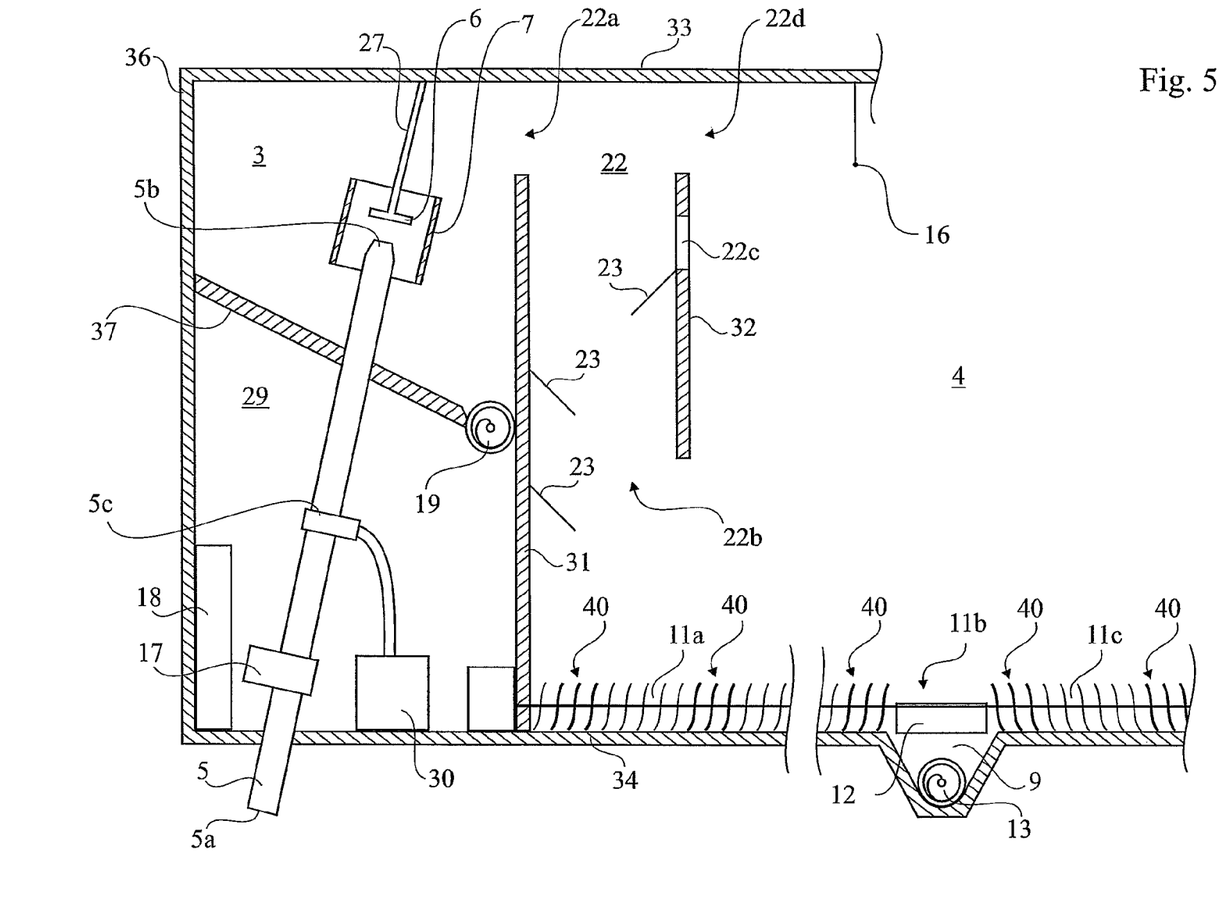
FIG. 5 shows a somewhat enlarged view of the front part of the dewatering device, where the mixing chamber is arranged.

Further, a hard plastic 40 has been sectionally fastened on the threading 11 of the feeding screws. The hard plastic 40 extends a few centimeters from the threading and works as an antifriction bearing. It is possible to arrange this extending plastic 40 continuously along the whole length of the feeding screws 11, but it is enough for the bearings to arrange it continuously along half a meter, for instance, followed by a gap of one meter, etc, as indicated by FIG. 5.

An inlet conduit 5 comes from the outside of the tank 2 through the control and regulation chamber 29 and finally into the mixing chamber 3, where the conduit 5 has its outlet opening 5b. The inlet conduit 5 has a connection gate 5a outside the tank 2 for the possibility of connecting tubes for inlet of polluted water and sediments.

The inlet conduit 5 also has a connection 5c for adding liquid polymer for the incoming flow in the conduit 5. The connection 5c can, for example, be one or more openings in the inlet conduit 5 with valves for regulating the inflow of substances. A container 30 containing liquid polymer is connected via a tube to the connection 5c and can be pumped into the conduit 5 by using a pump.

The control and regulating unit 18 collects data concerning a dry substance rate indicator 17, for example by measuring the density of the liquid in the conduit 5, and according to those data regulates the amount of liquid polymer for injection into the flow in the inlet conduit 5 and sends the required control signals to the polymer pump and valves at the connection 5c Data regarding the flow velocity for the liquid of the inlet conduit can be used for determining the amount of liquid polymer that needs to be added. The dry substance rate indicator 17 is preferably placed before the connection 5c, (with respect to the flow direction).

The incoming conduit 5 is narrower in the outlet gate 5b and points the flow towards an oppositely placed distribution disk 6. The distribution disk 6 is a circular disk opposite and on a regulated distance from the opening of the conduit 5b, in such a way that it is perpendicular to the liquid flow. The distribution disk 6 is mainly centrally placed in the mixing chamber 3 and fastened to a bar 27 from the top of the tank 34.

Figure 6:
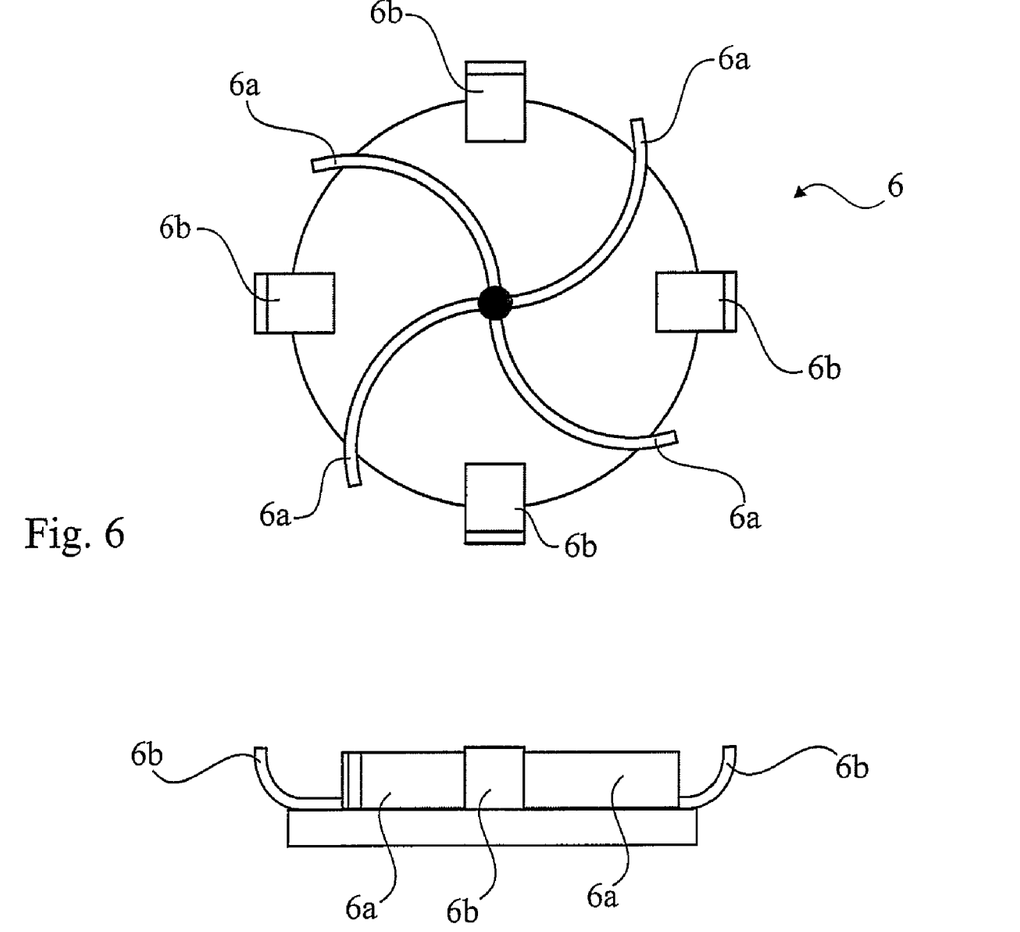
FIG. 6 shows the dispersion disk according to a preferred embodiment of the invention.

A cylinder 7 with open ends surrounds the opening of the conduit 5 and the distribution disk 6. The surface of the distribution disk 6 which meets the incoming flow has got two S-shaped profiles (FIG. 6) which extend perpendicularly from the distribution disk 6 and divides it into four identical quadrants. Centrally placed in each quadrant even at the periphery of the disk, a bended profile 6b which is bended towards the outlet gate 5b is provided. When the flow hits the distribution disk 6 a turbulent flow is created in the cylinder 7 and dispersed in the whole of the mixing chamber 3. The S-shaped profiles create a swirl when receiving the incoming flow, However it should also be understood that also other kinds of shapes could be used to create turbulence, for instance irregular surfaces, but even a flat surface could be sufficient.

At the bottom of the mixing chamber 3 there are evacuation means 19, 21 for removing larger objects from the bottom of the mixing chamber; here shown in the form of a second transversal outlet screw 19 in a conduit 21. The conduit 21 in which it is placed has got its opening 21a in the very bottom of the mixing chamber. The conduit 21 follows the bottom of the mixing chamber 37 with an angle of about 30 degrees upwards and reaches the outside of the tank 2, where there is an outlet opening 21b. This screw 19 is provided for removing large objects such as stones and the relatively steep incline of the screw 19 makes the water flow back and not be removed by i.e. screwing only large objects are screwed out. The screw is controlled by a motor 20.

The flow in the incoming conduit 5 is normally around 50-150 liters/second and when the jet hits the distribution disk 6 strong, turbulent streams are generated in the mixing chamber, caused by the force of the incoming flow and the profiles of the distribution disk 6. This makes the added liquid polymer mix all the more effectively with the polluted water. Stones, gravel, metal parts and the like sink to the bottom of the mixing chamber, where the second crosswise arranged screw 19 slowly rotates and screws them out of the facility.

Afterwards the mixture flows out into the big part of the tank 2, the sedimentation chamber 4, via the turbulence reducing passage 22 where the mixture is divided by angled sheets 23. The suction power of the ionically charged microscopical spirals of the polymer affects all the particles in the area and creates small lumps which become heavier and sink.

On the bottom of the sedimentation chamber 4 the five longitudinal screws 11 push the sediment material towards the second outlet 9, where it is concentrated and let out for deposition. The almost 100% clean water will be let out at the top back part of the tank and can be recycled to the nature.

It is obvious to the skilled in the art that the innovation is not limited to the embodiment described above, but the innovation can be varied within the scope of the appended claims.

For example; even if we have described that liquid polymer shall be injected into the incoming flow in the inlet conduit 5, the man skilled in the art realises that other flocculation chemicals can also be used It is also possible for the tank 2 to have a rectangular or quadratic cross-section.

Even though the inclination angle of the conduit 21 is shown at about 30 degrees upwardly, other inclination angles may be used, however preferably the inclination angle should be at least 10 degrees, more preferred at least 20 degrees.

The invention claimed is:

1. A device for dewatering dredged material with a dry substance rate below 15%, comprising:
   a tank arranged with at least one inlet conduit for dredged material;
   a first outlet for cleaned water; and a
   second outlet for sludge;
   the tank further comprises a mixing chamber, to which the at least one inlet for dredged material leads, and a sedimentation chamber in which the first and the second outlets are arranged, where the mixing chamber and the sedimentation chamber are in fluid communication, the at least one inlet conduit having one end on the outside of the tank for connection with an extern tube and an outlet opening in the mixing chamber, at least one of the inlet conduit(s) including a connection for injection of at least one flocculation chemical to the inlet;
   a turbulence means for creating a turbulent flow in the mixing chamber for mixing incoming dredged material with the at least one flocculation chemical; and
   an evacuation means for removing stones and gravel from the bottom of the mixing chamber via a third outlet of the tank, wherein the evacuation means is at least one screw at the bottom of the mixing chamber.

2. A device according to claim 1, wherein the turbulence means being a surface facing the outlet opening, the surface having at least one protrusion protruding from the surface.

3. A device according to claim 2, wherein a cylinder surrounding the outlet opening.

4. A device according to claim 1, wherein the turbulence means being arranged centrally in the mixing chamber on a predetermined distance from the outlet opening.

5. A device according to claim 1, wherein the turbulence means being surrounding by an open-ended cylindrical object.

6. A device according to claim 5, wherein the turbulence means being disk shaped and arranged mainly parallel to the radial direction of the cylinder.

7. A device according to claim 1, wherein the at least one inlet conduit tapering at its outlet opening.

8. A device according to claim 1, wherein the mixing chamber is smaller than the sedimentation chamber.

9. A device according to claim 1, wherein the second outlet for sludge being arranged at the bottom of the sedimentation chamber and the sedimentation chamber comprising means for moving sediment towards the second outlet.

10. A device according to claim 9, wherein said means for moving sediments comprising at least one longitudinal screw at the bottom of the sedimentation chamber.

11. A device according to claim 9, wherein said means for moving sediments comprising at least three longitudinal screws.

12. A device according to claim 1, wherein the mixing chamber being arranged at one longitudinal end of the sedimentation chamber and the first outlet being arranged at an upper part of the opposite end.

13. A device according to claim 1, wherein the second outlet in the sedimentation chamber comprising a conically tapering indention in the bottom of the sedimentation chamber, where a first transversally arranged outlet screw is arranged at the very bottom of the indention, which screw being arranged to feed sludge out via a sludge valve.

14. A device according to claim 1, wherein a level indicator being arranged above the second outlet to measure the sludge accumulation.

15. A device according to claim 14, wherein a dry substance rate indicator being arranged in the at least one inlet conduit before the connection for flocculation chemicals with respect to the flow, to measure the dry substance rate of the incoming contaminated dredged material in the at least one inlet conduit.

16. A device according to claim 15, wherein the device further comprising a control unit, which determines, based on information from the dry substance rate indicator, the quantity of at least one flocculation chemical, which is to be added to the incoming dredged material at the connection for flocculation chemicals.

17. A device according to claim 16, wherein the control unit regulating the speed of the first crosswise arranged outlet screw and also regulating the opening and closing of the sledge valve, based on information from the level indicator.

18. A device according to claim 1, wherein the at least one flocculation chemical which is added being a liquid polymer.

19. A device according to claim 1, wherein the at least one screw is upwardly tilted towards the third outlet.

20. A device according to claim 1, wherein the device being mobile.

21. A device according to claim 1, wherein the mixing chamber being smaller than the sedimentation chamber.

22. A device according to claim 1, wherein the mixing chamber is less than 1/10 the size of the sedimentation chamber.

23. A device according to claim 1, wherein the mixing chamber is less than 1/20 of the size of the sedimentation chamber.

24. A mobile device for dewatering dredged material with a dry substance rate below 15%, comprising:
   a tank arranged with at least one inlet conduit for dredged material;
   a trailer comprising wheels, the tank being connected to the trailer;
   a first outlet for cleaned water; a
   second outlet for sludge;
   the tank having a mixing chamber to which the at least one inlet for dredged material leads, and a sedimentation chamber in which the first and the second outlets are arranged, where the mixing chamber and the sedimentation chamber are in fluid communication, the at least one inlet conduit having one end on the outside of the tank for connection with an extern tube and an outlet opening in the mixing chamber, at least one of the inlet conduit(s) including a connection for injection of at least one flocculation chemical to the inlet; and
   at least one screw at the bottom of the mixing chamber constructed and arranged to remove stones and gravel from the bottom of the mixing chamber via a third outlet;
   a turbulence means for creating a turbulent flow in the mixing chamber for mixing incoming dredged material with the at least one flocculation chemical during use of the device.

25. A method for dewatering dredged masses, wherein the dredged masses are pumped into a tank via a conduit, the method comprising the following steps:
   a) measuring a dry substance rate of an incoming polluted dredged masses in the conduit;
   b) adding at least one flocculation chemical to the conduit to the incoming polluted dredged masses, wherein the quantity of added at least one flocculation chemical is determined based on information from the measuring in step a);
   c) mixing in a mixing chamber of the polluted dredged masses and the added at least one flocculation chemical, which mixing is achieved by the polluted dredged masses including the added at least one flocculation chemical being injected towards a turbulence means in the mixing chamber and a turbulent flow arising in the mixing chamber;

d) utilizing at least one screw as evacuation means for removing stones and gravel from the bottom of the mixing chamber, e) sedimentation of the mixture from step c) in a sedimentation chamber which is in fluid connection with the mixing chamber;

f) removing the sediment via a second outlet at the bottom of the sedimentation chamber; and g) removing the surface water from the sedimentation chamber via a first outlet.

* * * * *